April 1, 1952
M. A. J. HONNORE ET AL
MEANS FOR GEAR SHIFTING IN
HIGH-POWER MANIFOLD UNITS
2,590,861
Filed Jan. 19, 1949
9 Sheets-Sheet 1
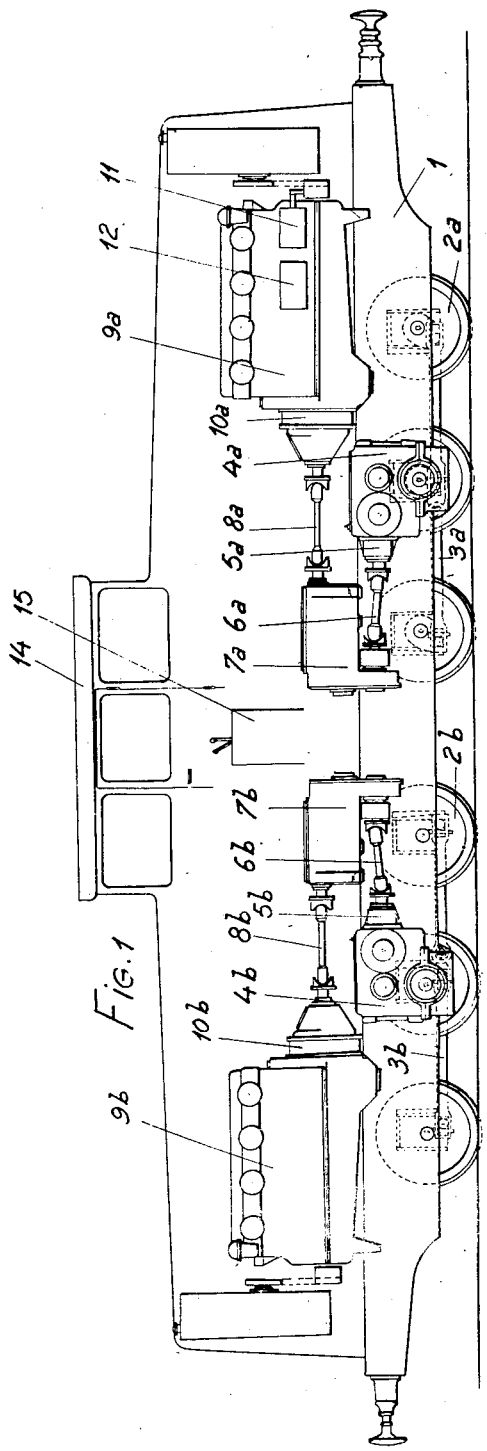
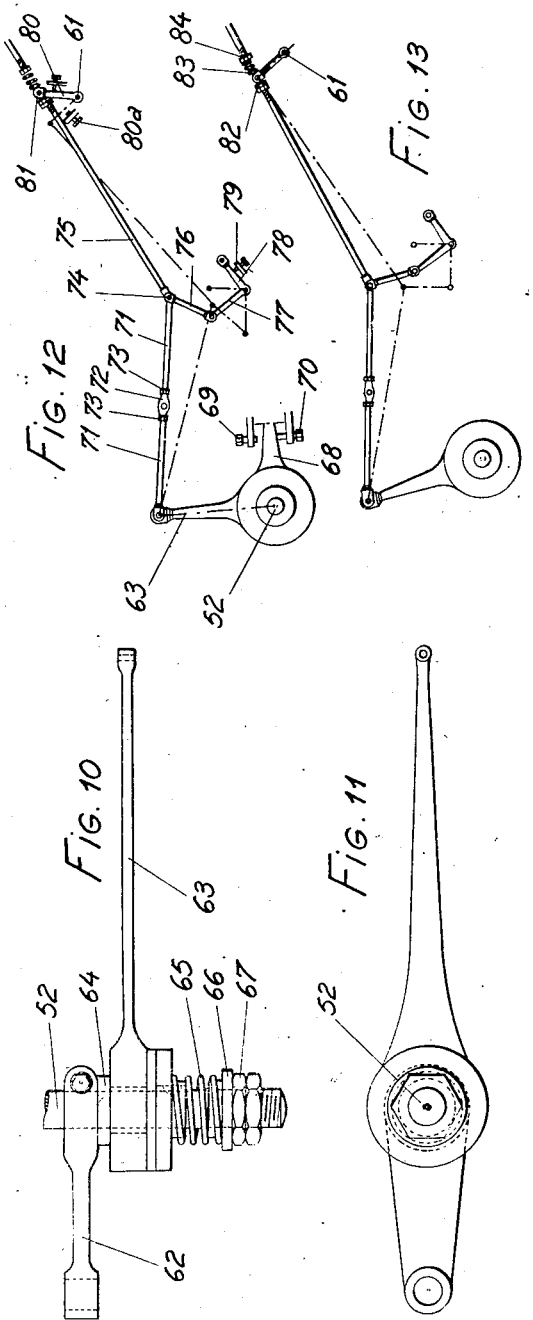
Michel A. J. Honnoré
Pierre M. F. Zens
Inventors
by: J. Delattre-Seguy
Attorney

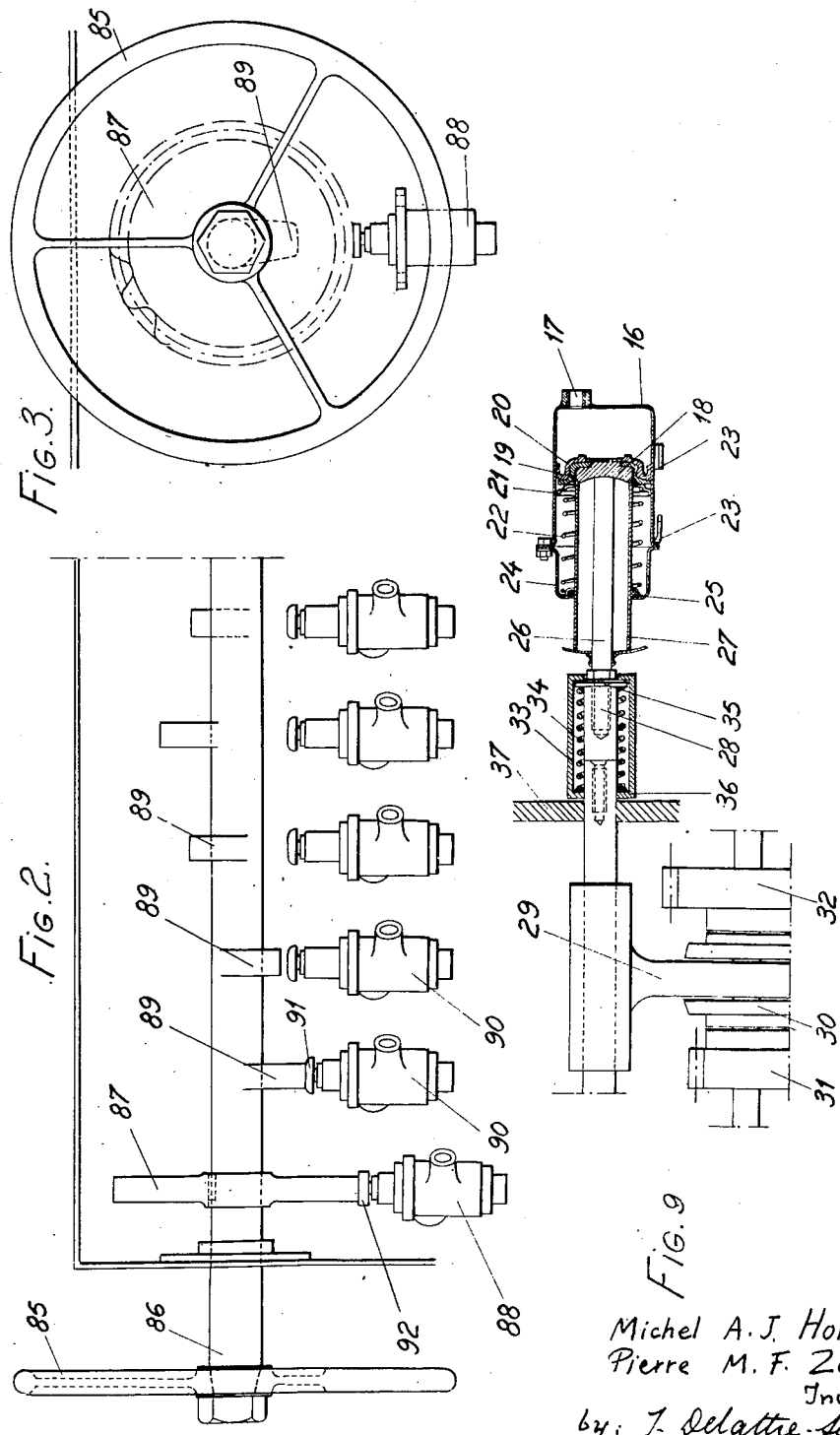

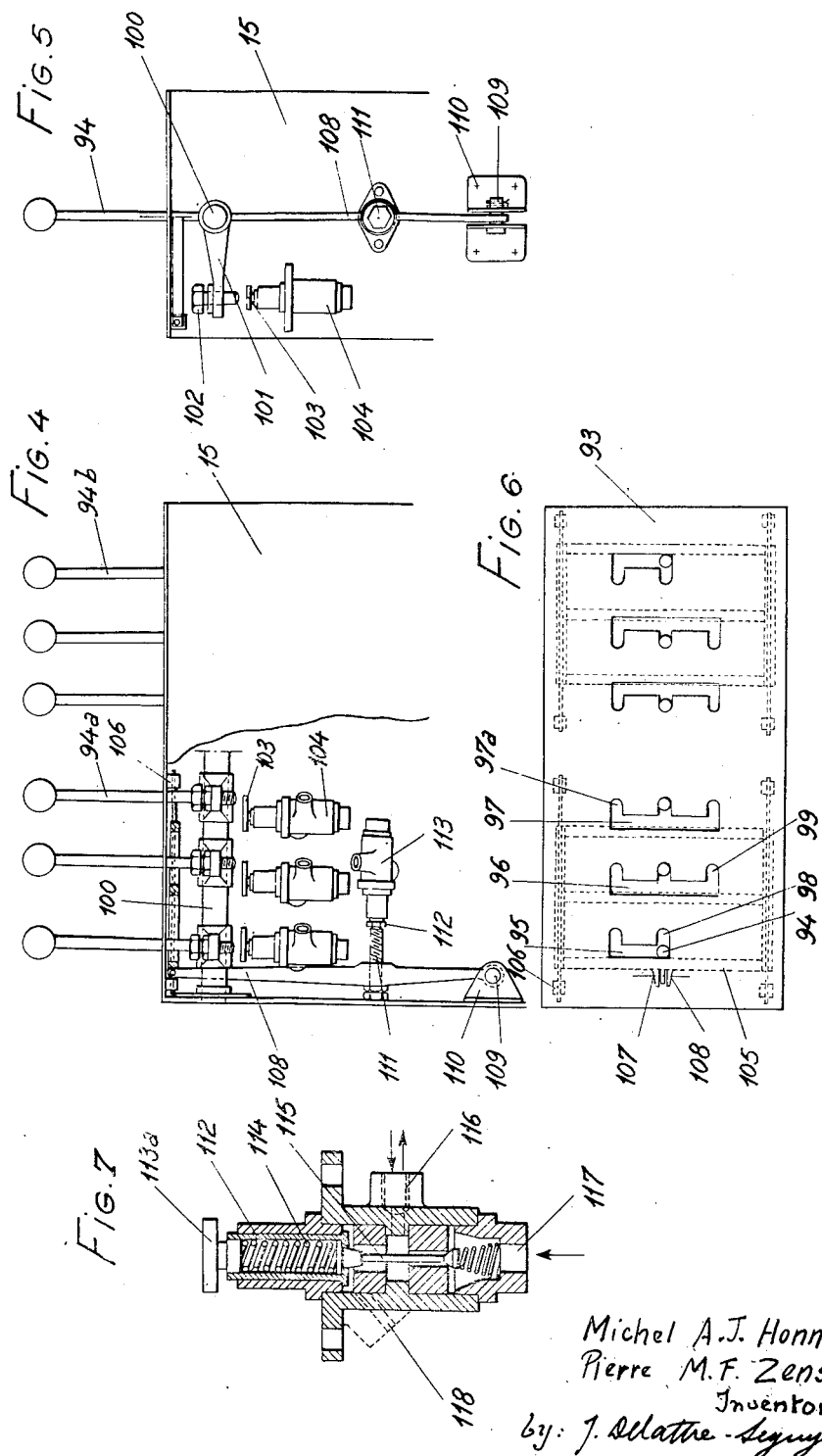

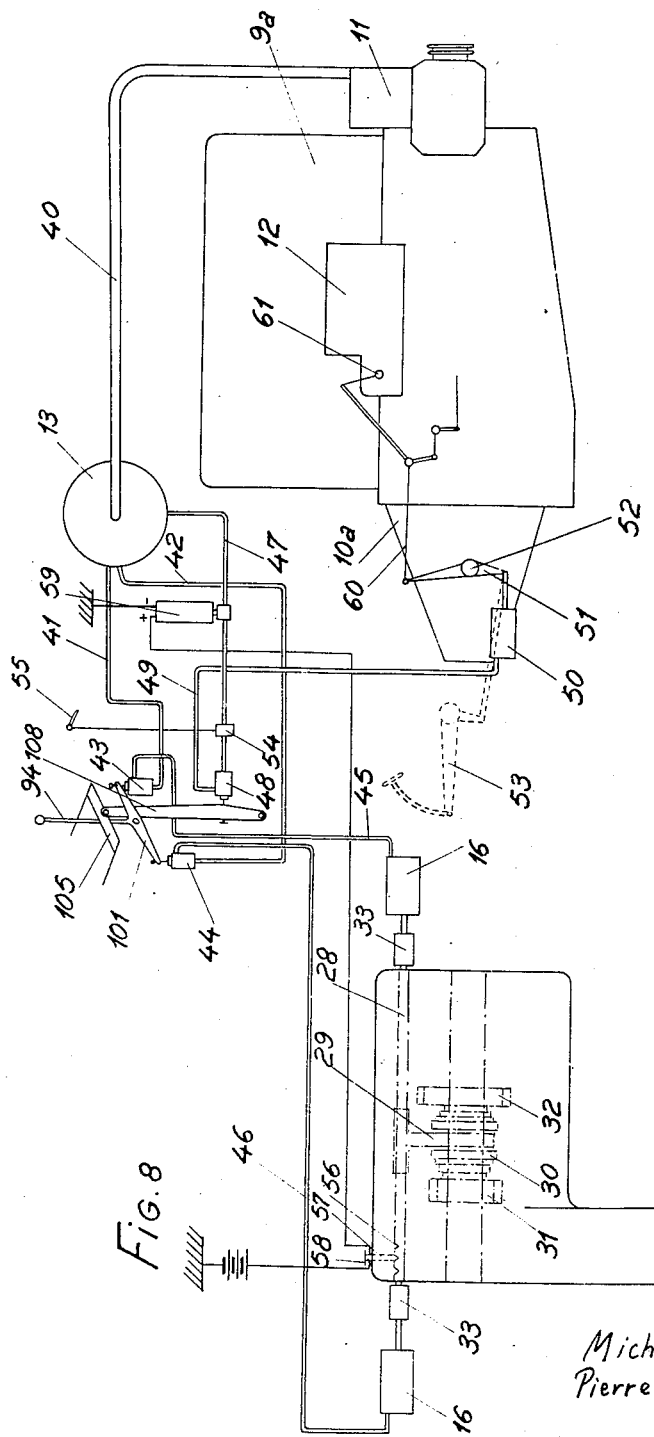

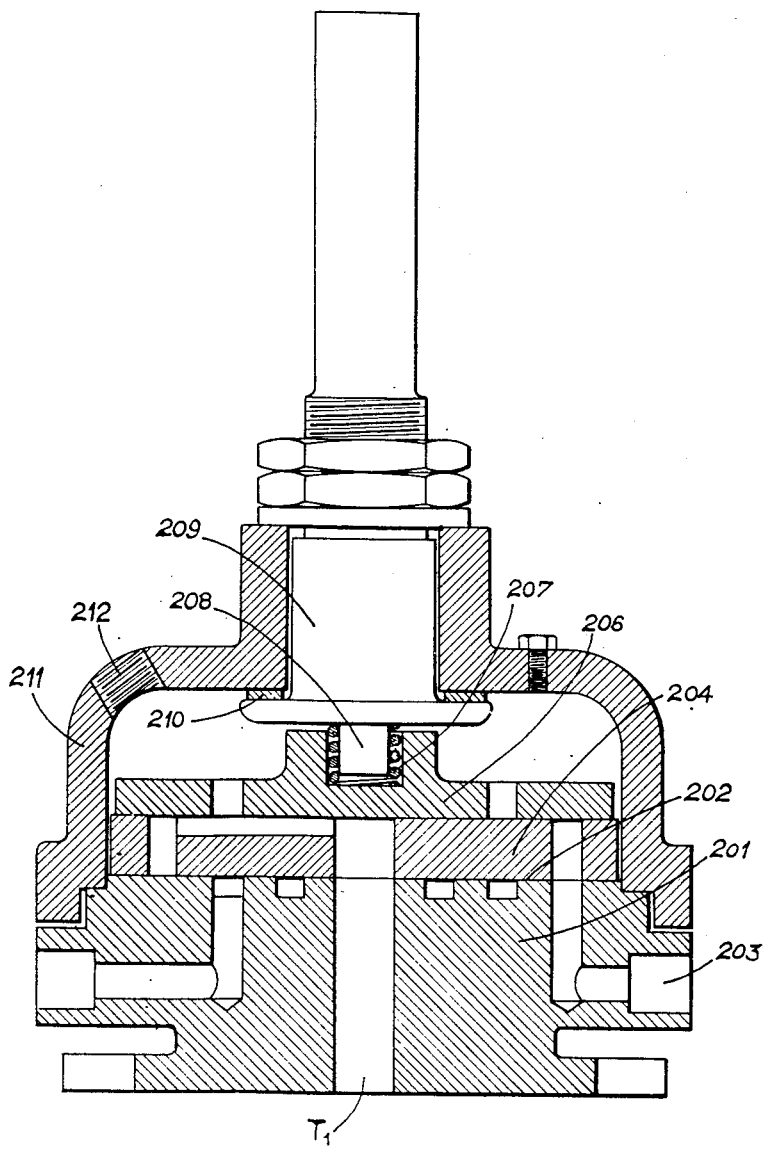

Michel A.J. Honnoré
Pierre M.F. Zens
Inventors
by: J. Delattre-Seguy
Attorney

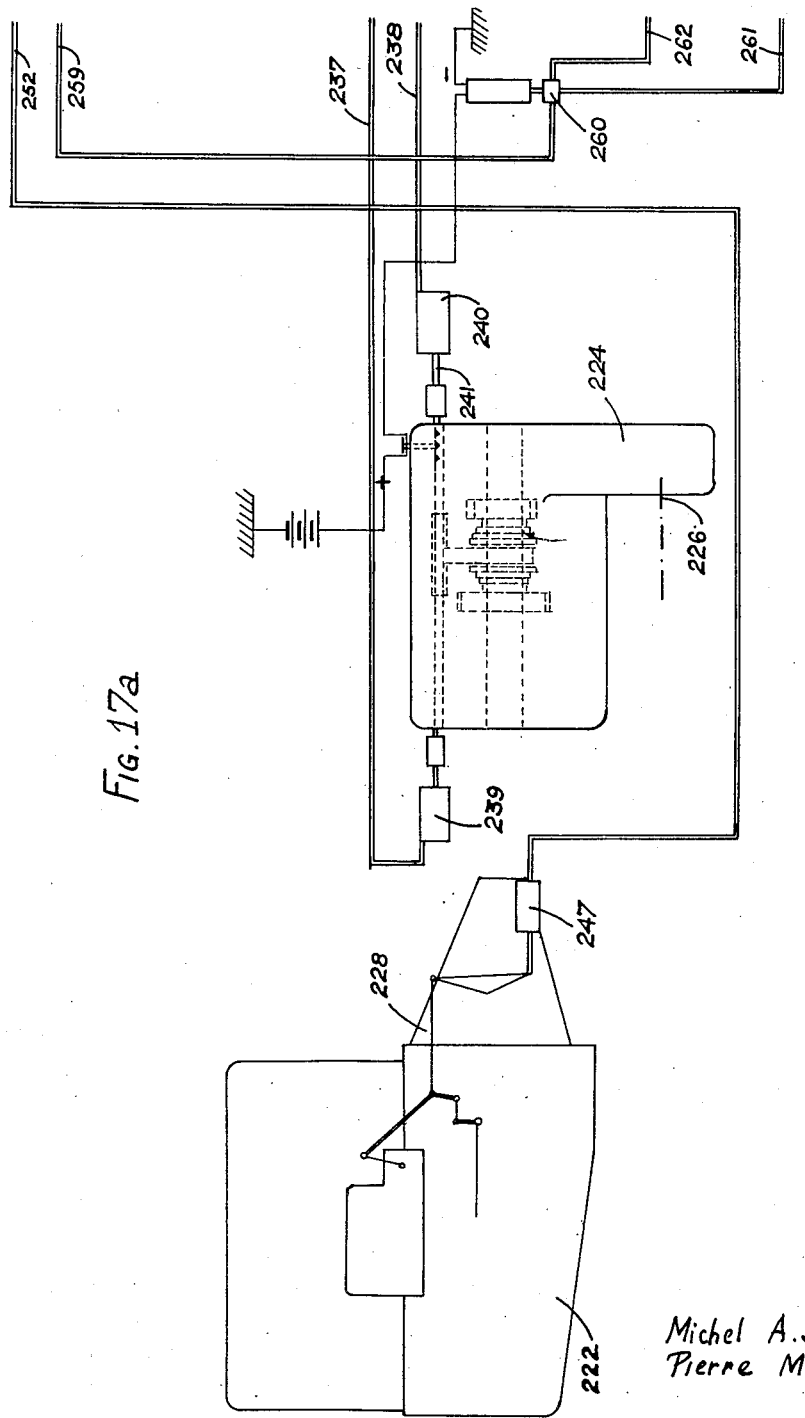

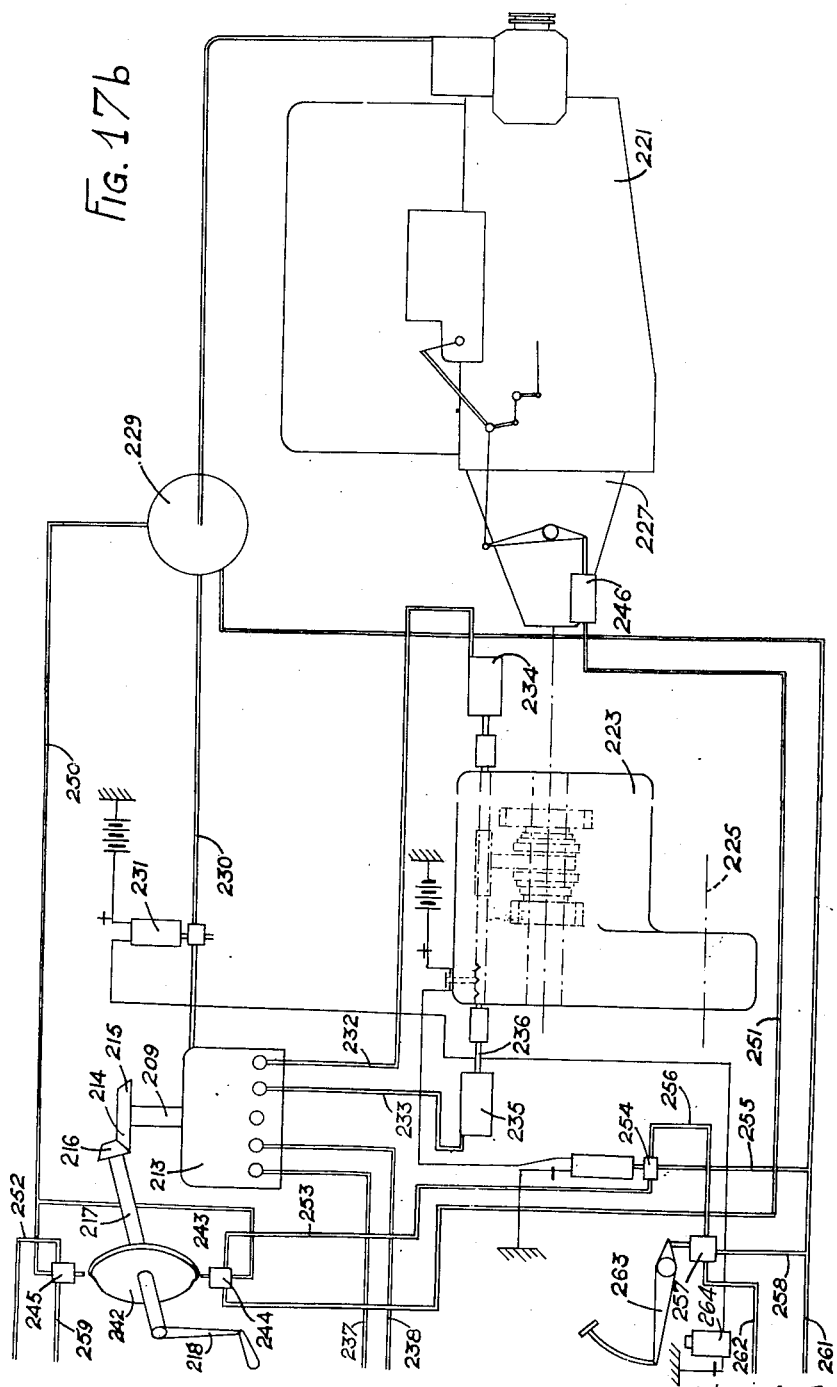

April 1, 1952
M. A. J. HONNORE ET AL
2,590,861
MEANS FOR GEAR SHIFTING IN
HIGH-POWER MANIFOLD UNITS
Filed Jan. 19, 1949
9 Sheets-Sheet 9
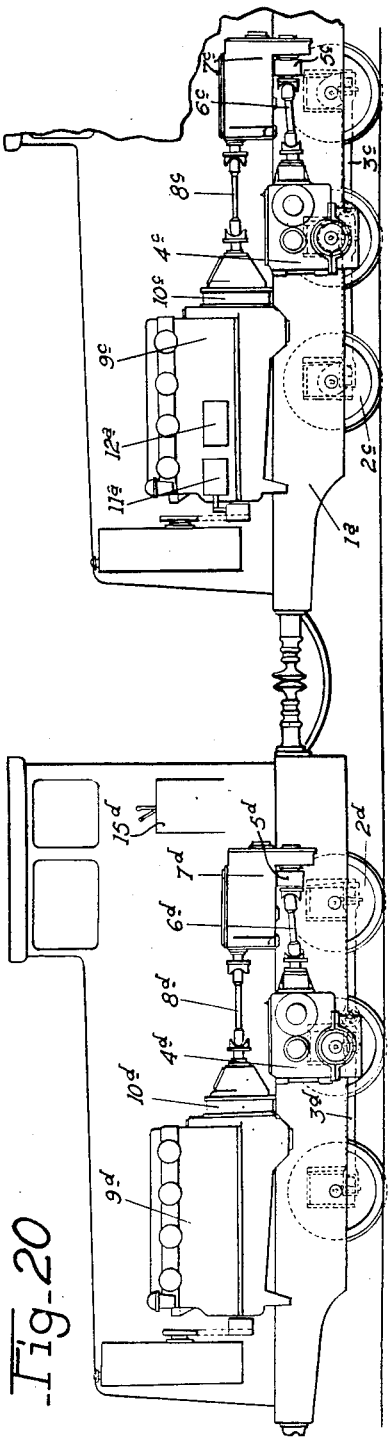
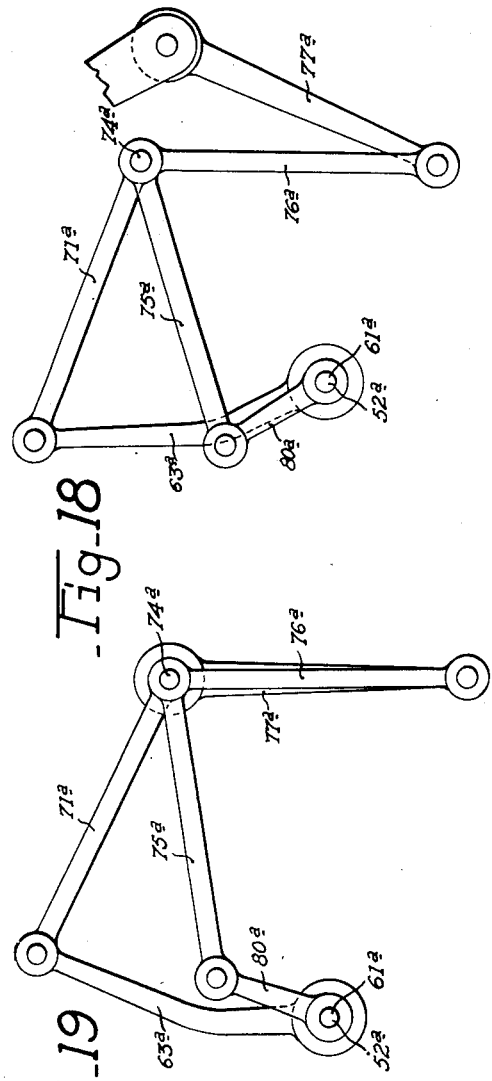
Inventors:
Michel A. J. Honnoré
and Pierre M. F. Zens
by: J. dcCattre-Seguy
Attorney Patented Apr. 1, 1952

2,590,861

UNITED STATES PATENT OFFICE 2,590,861

MEANS FOR GEAR SHIFTING IN HIGH-POWER MANIFOLD UNITS

Michel Albert Jules Honnoré and Pierre Marie Felix Zens, Paris, France

Application January 19, 1949, Serial No. 71,652
In France January 28, 1948

21 Claims. (Cl. 192—.062)

Average and high power units, and especially those providing mechanical drive transmission means, generally offer, on shifting speeds, the drawback of incurring considerable discontinuity in torque. This drawback is particularly serious in the case of railway locomotives driven by internal combustion engines in which the resistance opposed by the couplings makes it impossible to exceed a predetermined limiting draft force.

This is due to the fact that beyond a predetermined power output, the jolts caused by clutch engagement and release upon shifting the various gear-combinations in the speed-box, are liable to set up, through the railway trains drawn by the engines, a wave motion effective to compress and release violently the buffer and coupling springs, which among other drawbacks may cause breakage in the couplings.

On the other hand, economical conditions of operation and construction are such as to make purely mechanical transmission means preferable, from the standpoint of efficiency, over any other type of device. It therefore was impossible, so far, for manufacturers of internal-combustion locomotives, to construct such units having a power-output in excess of a given limit, since such a construction, aside from the dangerous shortcomings encountered in service and described above, was delicate to carry out.

An object of our invention is to overcome these drawbacks by dividing the driving power between a plurality of separate drive units, whose torque is cut out alternately or successively only when a shift in gear is to be made.

For that purpose, according to our invention, internal combustion-driven locomotives are provided with manifold drive units each separately actuating a corresponding drive axle through the medium of speed-boxes individual to each of said units, the said speed-boxes rather than being operated in synchronism together being operated in succession and either automatically or under manual control, as required by the driver's will. In this way, any jolts transmitted to the draft couplers, assuming the locomotive comprises two engines for instance, will only result in the transmission of one half the driving power, thus notably reducing or even removing the above-mentioned difficulties, inasmuch as there never is a complete break in the draft force.

Gear-shifting controls according to the invention are desirably made in the form of a pneumatic transmission whereby it is possible to centralize all the controls on a common control desk. Said desk may comprise an entirely automatic control formed by a cam mechanism for example, combined or not with a separate manual control for each unit, or simply a manual control for each unit.

In order to render the movements which the locomotive driver may have to perform easier to execute and nearly-automatic the said speed-box control is combined with a clutch-release control and a control acting on the power output and speed of the engines. The clutch-release control which also makes use of compressed air, is further adapted to be moderated by means of a pedal by which it is possible to proportion or adjust the otherwise often violent action of the compressed air with a compressed air-adjusting valve completing the device.

The clutch-control has associated with it a linkage connected with the engine speed- and power-regulating means; in the case of an internal combustion engine of the diesel type, such means may comprise a fuel-injection pump. In such a case, the linkage makes it possible, when a de-clutching operation is to be made, to bring the engine to idling conditions regardless of the setting of the control lever operated by the driver, while a renewed clutching operation will restore the linkage and consequently the fuel-injection pump to the settings occupied thereby prior to declutching.

Use of a plurality of transmissions adapted to be even momentarily in mesh on different gear ratios is only possible on condition that freewheel means are interposed between the engines and the axles, thereby eliminating the definite hazard of overspeeding which the engines would not withstand. More specifically, it is preferable to place the free wheel device between the drive shaft and the speed box in order to facilitate the gear shifting operations and the use of automatic controls. Thus, due to the provision of a free wheel in the first place, and in the second place due to the fact that there is now no inconvenience, in shifting gears quite harshly because of the provision of other drive units remaining in action, the clutching operations may now be performed without any special skill being required. The described device may also include modifications in the automatic clutch means associated with the free wheel devices, or otherwise and the transmissions may comprise one or more free wheel devices between the drive wheels and the clutch.

Similarly the clutch may be completed or even replaced by a hydraulic coupler which may or may not operate as a torque-converter.

It is obvious that any machine having manifold drive units is adapted to be equipped with manifold speed boxes and the invention is not restricted in its applications to internal combustion locomotives.

According to a simplified embodiment of the automatic control means referred to, most of the compressed air valves are omitted and replaced by a single distributing cock. Said distributing cock is somewhat similar to those used for compressed air braking means as incorporated in steam engines. It includes a circular slide-face into which open the distributing channels leading to the channels to which are connected the pipes feeding compressed air to the different control cylinders.

A pivoting slide-valve associated with said slide-face is provided with corresponding distributing ports, the system incorporating the slide-valve and the slide-face superposed thereto providing a movable fluidtight joint. The slide-valve and slide-face are contained inside a fluidtight casing inside which ends the pipe for admission of compressed air fed by the container. The slide valve is controlled by a shaft that passes fluidtightly through the casing. Said shaft is connected through the agency of speed reducing means with a control knob.

According to an advantageous feature, the spindle carrying the control knob is provided with a cam that acts on the pusher members of two compressed air valves that control respectively the admission means of compressed air into the control cylinders for the clutches of the driving groups.

The ensuing description made in reference with the accompanying drawings given by way of non restrictive examples will clearly show in what manner the invention may be performed. In said drawings:

Fig. 1 diagrammatically illustrates in longitudinal section a locomotive provided with two drive units and two gear boxes.

Fig. 2 diagrammatically illustrates the distributing device for the fluid controlling the gear-shifting and clutch operations.

Fig. 3 is a side view corresponding to Fig. 2.

Fig. 4 is a diagrammatic view partly broken away of a manual control device.

Fig. 5 is a side view corresponding to Fig. 4.

Fig. 6 is a plan view corresponding to Fig. 4.

Fig. 7 is a diagrammatical section of a distribution valve.

Fig. 8 is a diagram of the arrangement of the speed shifting controls.

Fig. 9 is a sectional diagram of the control mechanism for the claw-clutch members causing engagement between the various gear-teeth.

Fig. 10 shows the friction connection between the clutch control shaft and the lever actuating the injection-pump linkage.

Fig. 11 is a side view corresponding to Fig. 10.

Fig. 12 illustrates the injection pump control linkage in its full power position.

Fig. 13 corresponds to Fig. 12 but relates to the minimum power position.

Fig. 14 is a cross-sectional view through the axis of the distributing cock substituted in a further embodiment for the compressed air valve.

Figure 15:
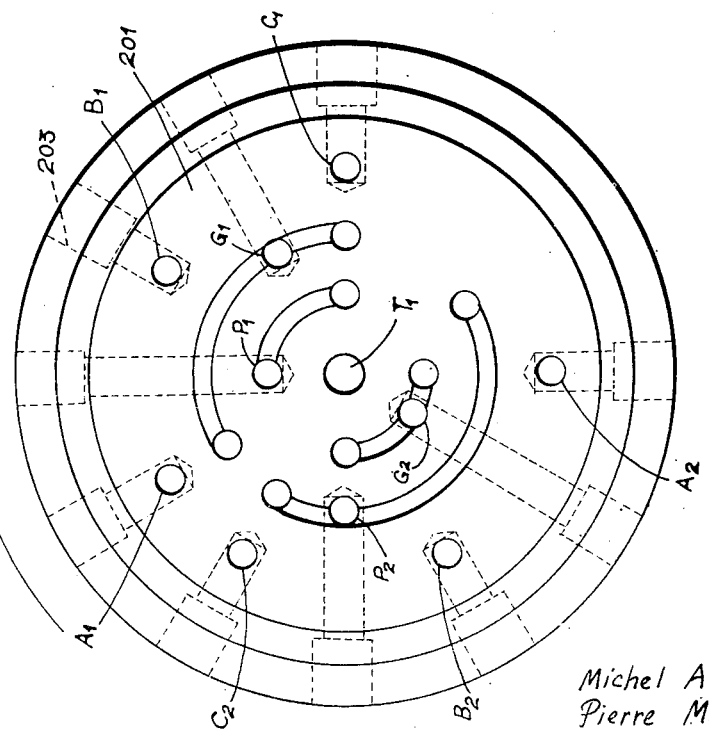

Fig. 15 is a plan view of the valve-face in said cock.

Figure 16:
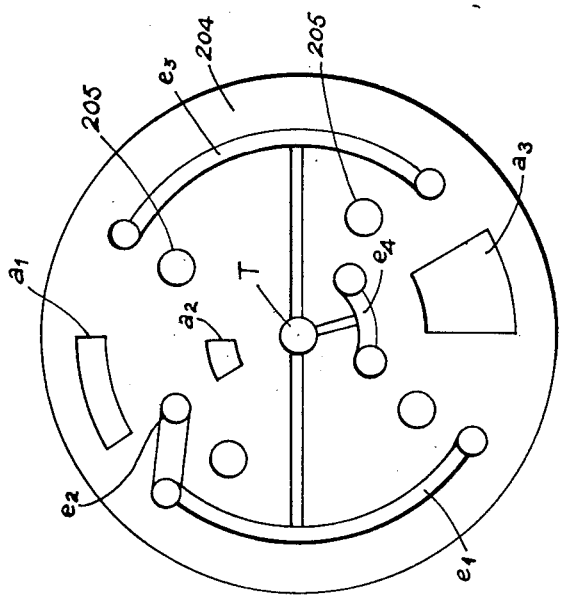

Fig. 16 is a plan view of the slide valve associated with said slide face in the embodiment of Fig. 13.

Fig. 17 is a diagram illustrating the distribution of compressed air to the different control members for the clutches and change speed gears, said figure being subdivided for sake of convenience into two parts 17a and 17b.

Figs. 18 and 19 represent an alternative embodiment of the linkage illustrated in Figs. 12 and 13 respectively relating to the full and minimum power positions.

Fig. 20 diagrammatically illustrates in longitudinal section two locomotives provided with a common controlling assembly according to the invention.

The speed-or-gear shifting mechanism according to the invention is as clearly shown in Fig. 1, mounted on an internal combustion locomotive having a body 1 with two sets of three axles 2a and 2b interconnected by links 3a—3b. The central axle supports bridge units 4a and 5b which comprise speed reducing bevel gear transmissions and the input shafts to which comprise a free wheel 5a—5b. The bridge units 4a and 4b also contain speed reversers which provide for two-way operation of the locomotive. The free wheels could be arranged at the outlet of the speed boxes themselves as illustrated at 5c and 5d in the embodiment shown in Fig. 20.

An intermediate shaft 6a—6b the ends of which are provided with universal joints, connects the free wheel 5a—5b with the output of a change speed box 7a—7b. The change speed box 7a—7b is coupled by means of the intermediate shaft 8a—8b the ends of which carry universal joints with the output shaft from an engine unit 9a—9b having a casing that opens into the clutch casing 10a—10b.

One at least and preferably both of the engines are provided with a pump 11 generating compressed air. Each engine is provided with a liquid fuel injection pump 12, both the air-pump and the fuel pump being driven through suitable power take-off means. The air-pump 11 delivers into a tank 13.

Within the driver's cab 14 is arranged a control desk 15 to be described later.

The compressed air tank 13 is connected through a suitable valve arrangement with one of the gear-shift control cylinders 16. Said cylinder 16 is connected through its opening 17 with the compressed air intake pipe and contains a piston head 18 which through an annular member 19, supports a flexible annular packing 20. Under the member 19 there is a shoulder 21 forming an abutment for a return spring 22. On the cylinder 16 are provided securing lugs 23 and the end of the cylinder casing 16 has bolted to it a casing 24 provided with a sealing ring 25, said casing 24 providing a stop for the spring 22. The piston rod 26 is surrounded by a tube 27 in sealing engagement with the casing 24 and it is secured as by a threaded connection with a rod 28 acting as a support for a gear-shift selector fork 29. The fork 29 actuates in known manner a clutch carrier adapted to bring clutch claws into engagement with either a pinion 31 provided with a suitable set of teeth for engagement with said clutch claws, or with a pinion 32 also provided with a similar set of engaging teeth.

The gear-shift operations are preferably synchronized by means of an inertia-type synchronizer, a device known per se and immaterial as far as the invention is concerned, but having the advantage of preventing injury to the transmission through engagement of a speed prior to accomplishment of the synchronization, which would be frequently liable to occur herein since a pneumatic control, rather harsh in action, is used in the case illustrated. Likewise, the gear boxes are preferably provided with known interlocking means preventing simultaneous engagement of more than one gear combination.

The control rod 28 has arranged on it a bushing 33 enclosing a return spring 34 acting on a ring 35 rigid with the rod 28. The opposite end of the spring 34 acts on the end wall 36 of the casing 33, the end-wall 36 being spaced with a substantial clearance away from the wall 37 of the gear box constituting a stop therefor, in order to free the dead center position thereof from any objectionable non-symmetrical resilient action.

Action of the springs 34 and 22 allows the device to return to dead centre conditions after the air pressure has stopped acting on the corresponding piston.

As clearly shown in Fig. 8 in which the operation of the gear-shift control valves is diagrammatically illustrated, the air-pump 11 driven by the engine 9a supplies the tank 13 through a suitable pipe 40. The tank 13 feeds through pipes 41—42 sets of valves 43—44 from which start pipes 45—46 leading to drive cylinders 16 similar to those described above.

In order to render gear-shifting a very easy operation, the clutch-release control 10a contained in the engine casing or arranged externally thereof, is also adapted to be operated through the agency of compressed air. To this effect, a pipe 47 is tapped off the tank 13 and leads to a valve 48 whence a pipe 49 conveys said compressed air to a clutch-operating cylinder 50. The clutch cylinder 50 acts on a balance lever 51 which rocks the clutch shaft 52.

The clutch device is so designed that a spring constantly tends to separate the clutch plates, said clutch plates being adapted to be moved towards each other by admission of compressed air into the cylinder 50.

Two separate means for adjusting the clutch operation are available for operation by the driver; such means comprise a conventionally arranged pedal 53 whereby the driver may, when starting, reduce or shut off the action of compressed air, and a valve 54 arranged on the pipe 47 for reducing or shutting off the admission of compressed air, so that it is possible to perform the necessary operations with accuracy through the manual control 55 arranged adjacent to the window of the cab 14.

For greater safety and to prevent untimely clutch engagement when the interengaging claw members are not yet completely in mesh, the gear-shift control rods 27 are formed with notches 56 equal in number to the rest positions said rods are to occupy, said notches being engageable by the push-rod 57 of an electric switch 58. The latter is connected through suitable electric conductors with a source of energy, not shown, and is arranged in series with an electrically operated valve 59 arranged on the pipe 47 and adapted to cut off the admission of compressed air as long as any one of the gear settings is not fully engaged or the dead center setting not fully in place. A common electrically operated valve 59 is of course mounted in series with all the switches 58 corresponding to the various gear-operating rods 28.

In order to render the device still more practical in operation, the clutch operating leverage, and particularly the end of the balance lever 51 is connected through a linkage 60 with the lever 80 of the shaft 61 provided for adjusting the fuel-injection pump 12. Said leverage 60 is clearly shown in Figs. 12 and 13.

The lever 63 is mounted for free rotation on the shaft 52 (Fig. 10) but is continually urged against the ring 64 by a spring 65 that may be adjustable by a stop 66 blocked with a nut and lock-nut 67. The lever 63 may if desired be completed by a stop finger 68 adapted to limit its angular displacement, the stop finger bearing against stops 69—70 at the ends of its travel.

The lever 63 is coupled at its free end with a control rod 71 adjustable in length by means of a device 72 comprising opposite-pitch screw threads well-known per se and blockable by means of lock-nuts 73 carried by the two rod portions to be connected, said rod 71 being pivoted on a pin 74 which forms a common point for three rods; to said pin 74 are pivoted in addition to the rod 71, a rod 75 connected with the member to be regulated, viz. the injection pump 12, and a rod 76 the end of which is pivoted to a bell-crank lever 77 connected by the arm 78 thereof with the throttle lever. The arm 78 moreover serves as a stop cooperating with a stroke-limiting stop 79.

Fig. 12 corresponds with the clutched condition while the diagram of Fig. 13 relates to the de-clutched condition.

The shaft 61 of the fuel-injection pump is engaged by a lever 80 whereof the attachment 81 with the rod 75 comprises a slidable yoke held between a fixed stop 82 formed by a nut and lock-nut, and a flexible stop 83 formed by a spring pressed against a stop 84.

This device including two stops one of which is a flexible one may be omitted if, as illustrated in Figs. 18 and 19, both axes 61a and 52a are provided together on a common axis and if suitable equal lengths are selected for the rods 71a, 75a, 76a and the lever 77a. It is merely necessary moreover to secure the pivot of the bell-crank lever 77a in the setting occupied by the axis 74a when the engine is de-clutched and the injection pump in idle condition, on the one hand, and on the other hand, to cause the pivot connecting the levers 76a and 77a to coincide with the location of the pin 81a when the latter is in its idling position.

The automatic gear-shifting control device mounted on the control desk 15 comprises a hand-wheel 85 keyed on a shaft 86 constituting a camshaft. Fig. 2 illustrates only in part the control device which comprises a cam 87 actuating a clutch valve 88 and cams 89 adapted to actuate successively the gear-shifting valves 90, said valves 90 being those designated as 43—44 on Fig. 8 and the valve 88 the same as valve 48 in the same Fig. 8.

The cams 89 are formed with a single boss or high point and are adapted to engage once only the valve-actuating plates 91 during a complete revolution of the wheel 85, whereas the cam 87 is formed with a plurality of bosses and comprises at least as many bosses as there are valves 90 so as to engage the plates 92 actuating the valves 88 and thereby execute the requisite successive clutching and de-clutching operations, each time a valve 90 is closed and the following valve 90 opens, in order to provide disengagement of one gear and engagement of another gear.

It may sometimes be found desirable, in order to avoid too great a facility in driving which might lead to the driver becoming careless, which might lead to faulty operation liable to cause injury to the mechanical parts, to provide for the control of the gear-boxes in such internal-combustion engine locomotives through the agency of independently operating levers. To this end, the control desk 15 carries at its top a selector plate 93 through which two sets of levers 94a—94b extend. The levers 94a relate to the operation of the engine unit 9a, gear-box 7a, axles 4a, while the levers 94b are for the engine unit 9b, etc. The selector plate 93 is formed with slots 95—96—97 through which the levers 94 extend, the slot 95 having only two latching positions for the lever 94 at each end of the slot, said latching positions being provided by notches 98, while the slots 96—97 have three latching positions 99 (Fig. 6). The levers 94 are secured on a shaft 100 to which they are both pivotally and slidably secured. They are rigid with balance levers 101 carrying adjustable push-rods 102 adapted to engage the actuating plates 103 for the valves 104 (Fig. 5). Said valves 104 are the same as the valves 43—44 shown in Fig. 8.

Under the plate 93, grate-members 105 are slidably arranged, the bars of the grating being adapted to engage the levers 94 and urged into engagement therewith in the direction causing said levers to project into the notches 98 by means of spring means not shown. The grating 105 is mounted for sliding movement in guides 106 and comprises a yoke 107 in which a lever 108 is pivotally arranged, said lever in turn being pivoted on a pin 109 rigid with a yoke 110 provided on the side wall of the desk 15. The lever 108 comprises an adjustable push-rod 111 adapted to engage the actuating plate 112 of a clutch-control valve 113. The clutch-control valve 113 is the same as the valve 48 in the diagram of Fig. 8.

The compressed-air intake valves are of a well-known and widely used type comprising a push-rod 112 (Fig. 7) capped by a bearing head 113a which forms the above-mentioned plate 103. A spring 114 is adapted to transmit the impulses imparted to the plate 113a to a slide-valve member 115 comprising two oppositely tapered valve heads thereon, urged respectively against two seats adapted to separate the admission pipe 117 from the exhaust pipe 118 and between which the pipe 116 to be supplied opens. The slide-valve member 115 is restored to its sealing position with respect to the opening 117 communicating with the tank 13 when the push-rod 112 is in its uppermost position. The outlet opening 118 associated with the valve unit thus formed makes it possible to obtain the desired sudden release of the valve member 115 providing communication from the pipe 116 either to the pipe 117 or the pipe 118.

The device thus described operates as follows:

When the driver of the internal combustion locomotive wishes to operate a gear-shift, in the event the device is not automatic in operation, that is when a control desk is used of the type shown in Figs. 4 to 6, the driver actuates the lever 94 engaging the slot 95 so as to release the lever 94 out of the notch 98. The lever 94 under consideration slides along the shaft 100 and engages the first bar of sliding grate 105, thereby operating the valve 113, and urging the lever 94 under consideration to engage the notch opposed to the notch 98 and thus actuating one of the valves 104.

If the gear ratio selected is one corresponding to a desired low speed, the lever 94 corresponding to the slot 97 will have previously been operated to enter the notch 97a, the effect of this being to establish communication for the operating fluid with the control cylinders for the low-gear speed-box slide-rods.

As clearly shown in Fig. 8, the sliding movement of the grate or slide 105 will have caused the valve 48 to operate, thus releasing the clutch. The engagement of a lever 94 with a notch on the other hand produces clutch engagement, provided the selected gear is properly engaged and that the electrically operated valve 59 will allow compressed air to enter the valve 48. The driver can reduce the clutch action by acting on the pedal 53, or on the valve 55, or both. Each time a lever 94a or 94b is operated, there is performed a de-clutching operation, a gear is thrown out of mesh, a new gear is thrown into mesh and the clutch is reengaged. At the same time, the leverage 60 acts on the fuel injection pump, as clearly illustrated in the diagram of Fig. 12, to bring the engine to idling conditions during the de-clutching action and restore the selected power-operation of the engine as the clutch is reengaged.

Rotation of the lever 63 against the friction ring 64 of lever 63 is effective to exert a pull on the link 71, thereby rotating the link 80 regardless of the position of the bell-crank lever 78. This clutch-release action brings the link 80 against its idling stop 80a, whether the throttle lever is or is not in engagement with its open-throttle stop 79. At each gear-shift therefore the engine is automatically brought back to its idling rate of operation, and it thereafter, during the ensuing reengagement of the clutch, is returned to the speed which it is capable of assuming depending on the rate of fuel-injection as determined by the setting of the throttle lever.

After the driver has actuated one of the levers 94a, thus causing engagement of the engine 9a with the related axle-shafts, he will then operate a selected lever 94b of the second series, thus causing a repetition of similar operations for the engine unit 9b.

The provision of the free-wheel means 5a—5b is effective to isolate the gear boxes completely from any driving action on the part of the axle-shafts, and disengagement of the clutch will similarly isolate said gear boxes from the driving action of the engines, so that the gear shifting operations may be accomplished without any mechanical shocks as a result of the presence of the inertia synchronizer, as no speed can possibly be thrown into gear as long as full synchronism has not been attained. The provision of the described means is desirable so that roughness in operation as produced by the compressed air control may be of no consequence as concerns the mechanical elements.

In case an automatic control desk is used of the kind partly shown in Figs. 2 and 3, each gear-shifting action caused by the engagement of a cam 89 with a plate 91 and the uncoupling of two similar elements, is accompanied by an engagement of the cam 67 with the plate 92. Clutch release is thus had through a gear-shifting operation.

A locomotive or the like engine propelled vehicle using the gear-shifting method described and constructed as disclosed hereinabove will thus include a plurality of engines each comprising its individual and independently-acting mechanical drive including a free-wheel. The said mechanical drives are so established that the reduction ratio between two speeds corresponding to two successive speed settings of the same speed box is smaller than the ratio between the extreme speeds permissible for the corresponding engine when operating under full load, thus allowing the engines to operate continuously without any inconvenience, the speed ratio used for each successive drive being very near each other without however being equal.

The gear-shifts are successively effected for each drive or group of drives, so that at no time there is a break in the drawing effort.

A desirable arrangement for the automatic control desk is that provided with the following successive gear combinations or ratios:

For both engine units, respectively and in succession dead centre-dead centre, dead-centre-first speed, first speed-first speed.

1st-2nd, 2nd-2nd, 2nd-3rd, 3rd-3rd, 3rd-4th, 4th-4th, 4th-5th, 5th-5th, 5th-6th, 6th-6th.

The above relates to the case where the speed boxes are provided with six speed settings. Reverse is produced through the medium of the speed reducer units 4a—4b which also serve as reverser units.

One embodiment of a manual control-desk comprises two sets of three levers, as shown in Figs. 4, 5 and 6, the two central or inner levers being adapted to distribute the compressed air so as to provide the dead centre position, the lower speed ratios and the higher speed ratios. The six speed settings are obtained through operation of the intermediate and outer levers the manifold positions of which respectively correspond for each lever, to the first and the forth speed on the one hand, and the 2nd, 3rd, 5th and 6th speed on the other hand.

Obviously modifications may be made in the embodiment described without departing from the scope of the invention as defined in accompanying claims. In particular, the invention makes it possible to apply high power output to drive transmissions ill-adapted to withstand sudden shocks, through mechanical change-speed mechanisms of low cost price and high efficiency.

The number of drive units is of course not limited to two and this figure merely defines the lower limit of the possible number of drive units that may be used. The drive units may also be mounted on separate vehicles coupled together, as illustrated in Fig. 20.

Turning to Figs. 14 to 17 the distributing cock is provided (Fig. 14) with a base 201 the upper surface 202 of which forms the slide-face for the slide valve. The lateral substantially cylindrical surface of the base 201 includes tapped bores 203 adapted to receive the threaded connections for the pipes feeding compressed air. To the upper surface 202 forming the slide-face is pivotally secured in a fluid-tight manner a substantially cylindrical slide valve 204 that includes blind tapped bores 205 adapted to carry the bolts connecting the slide-valve 204 with a driving plate 206. This driving plate includes the female part 207 of a screw driver connection the male part 208 of which is rigid with a control shaft 209. This control shaft passes into the casing 201 through a fluidtight packing 210, said casing 211 being secured fluidtightly to the base 201 and capping the slide valve 204. The slide valve and slide face form a distributor provided with ports and channels arranged in a manner such that the control cylinders of the change speed gears are connected in succession with the container of compressed air or else with the exhaust. To this purpose as clearly apparent from Fig. 15 the slide-face is provided with six openings distributed over a same circumference in the following angular positions:

The port A2 corresponding to the engagement of the first speed of the change speed box No. 2 is located on the radius considered as the origin of the angles.

The port B2 corresponding to the second speed of the box No. 2 is located on a radius at +60°, the positive direction adopted for designating angles being that given out by the arrow.

The port C2 corresponding to the third speed of the box No. 2 is located on a radius at +120°.

The port A, that corresponds to the first speed of the change speed gear No. 1 is located on the radius at +150°.

The port B1 corresponding to the second speed of the casing No. 1 is located on the radius at +210°.

The port C1 corresponding to the third speed of the gear No. 1 is located on the radius at +270°.

On a circumference internally concentric with the above circumference are provided in the casing two semi-circular openings G1 and P2. The opening G1 communicates with the cylinder controlling the duplicating means of the change speed gear No. 2, said cylinder corresponding to the position of the duplicating means on the first speed reduction ratio. This opening connects a port in the slide-face with two terminal blind bores; it appears under the form of a channel starting from the radius at −30° and leading to the radius +120°. The second semi-circular channel G1 corresponds through a bore with the connection of the pipe distributing compressed air to the duplicating means of the change speed gear No. 1, which duplicating means is thus positioned on the large speed reduction ratio. The channel formed by said opening G1 extends between the radii at +150° and +270°.

Lastly, the slide valve 201 is provided in its upper part with two other semi-circular channels P1 and G2 controlling the duplicating means of the change speed gears, the channel P1 corresponding to the connection leading the compressed air to the duplicating means of the change speed gear No. 1 for positioning it on the small speed reduction ratio while the channel G2 leads to the channel connected with the control cylinder for the duplicating of the change speed gear No. 2 for positioning the latter on the large ratio of magnification.

The opening P1 extends between radii at +180° and +270° whereas the opening G2 extends between the origin of angles at 0° and the radius +90°.

The slide valve is also provided with ports and semi-circular channels. Three ports a1, a2 and a3 are adapted to provide for admission as follows:

The port a1 is adapted to register with the circumference of the slide face in which are provided the ports A2—B2—C2 and A1—B1—C1.

The port a2 is adapted to register with the circumference corresponding to the openings P1 and G2.

The port a3 is adapted to register with the circumferences corresponding to the ports A1—B1—C1 and A2—B2—C2 and also the semi-circular grooves or openings G1 and G2.

The ports a1—a2 are part annular and begin at the radius +150° and finish at the radius +180°.

The port a3 is located diametrically opposite said ports a1—a2 between the radius +330° and radius 360°.

The slide valve is also provided with two semicircular channels and four exhaust ports:

The exhaust ports e1—e3 are adapted to register with the circumference corresponding to the ports A1—B1—C1 and A2—B2—C2.

The port e2 is constituted by an opening provided in register with the circumference G1—P2, said opening being provided on the radius +150°.

The port e1 is formed between radii at +30° and +120° and extends slightly beyond the latter so as to provide a lead for the exhaust.

The port e3 extends between the radii at +210° and +300° while overlapping slightly beyond said radii for the same reason.

The port e1 is connected through a channel with the port e2, said channel starting from the end of the channel e1 located at +120°.

Lastly, a port e4 provided on the circumference corresponding to that including the channels P1 and G2 of the slide face extends between the radii —60° and +30°.

The ports e1, e3 and e4 are connected with a central opening T provided in the slide valve through the agency of channels. This central opening T registers with a central opening T1 provided in the slide face 201 and through which the compressed air may be exhausted. The introduction of compressed air is provided by a connection screwed into a perforation 212 of the cover 211.

In the position illustrated in the drawings, it is apparent that the compressed air is sent through the admission port 212 into the semicircular ports or channels corresponding to the first speed and to the small ratio in each change speed gear. When the slide valve is shifted by 30° in the direction given out by the arrow, it is apparent that the compressed air is sent into the admission ports, openings or slots corresponding to the first speed of the gear box No. 2 and to the second speed of the box No. 1.

When the slide valve is again shifted angularly by 30° it is apparent that the compressed air is sent into openings or channels that correspond to the second speed in both change speed gears.

A still further rotation by 30° brings the compressed air into openings or channels corresponding to the second speed in the gear box No. 2 and to the third gear in the case of the box No. 1. The twelve speed combinations may thus be executed through a successive rotation of the slide valve by 30° at each time.

As clearly apparent from Fig. 17, the above described distributor is designated as a whole by the reference number 213. It is driven through the speed reducing gear 214, one of the component gears 215 of which is rigid with the part 209 while cooperating gear 216 is rigid with a shaft 217, the free end of which is controlled by a hand-operated crank 218.

The two engines 221 and 222 include each a change speed gear of the type disclosed, said change speed gears being shown at 223 and 224 with corresponding output shafts 225 and 226 driving the sets of wheels. Each engine is also provided with a clutch 227 and 228. The container for compressed air 229 set under pressure by a pump sends this compressed air through a pipe 230 to the distributor 213. On the pipe 230 is provided an electrically operated valve 231 that allows connecting the distributor 213 with the exhaust. Said distributor 213 feeds the compressed air pipes that lead to the cylinders controlling the engagement of the different speeds. For sake of simplicity of the drawing, only four of these pipes have been illustrated. The pipes 232 and 233 leading to the cylinders 234 and 235 act in opposite directions on the same piston rod 236 controlling a sliding gear of the change speed gear box 223. Similarly the pipes 237 and 238 connect the distributor 213 with the cylinders 239—249 controlling through the piston rod 241 a sliding gear in the change speed box 224.

The reliability of engagement of the speeds in the change speed gears is provided through means similar to those disclosed hereinabove, said means including an electric system acting on electrically controlled valves adapted to prevent the connection between the corresponding engine and the transmission normally operated thereby.

To the shaft 217 mentioned hereinabove as a controlling means for the distributor is keyed a cam 242 provided with a semi-circular boss 243. This semi-circular boss 243 is located on the half circumference the diameter defining which corresponds to that in which the crank 218 lies. This boss 243 is adapted to act on the pusher members for two valves 244 and 245 controlling the distribution of compressed air to the cylinders for the pistons 246 and 247 controlling the clutch at the output of the engines 221—222. In this particular embodiment illustrated, the clutching is ensured elastically by springs in the conventional manner, the declutching being controlled through compressed air. The valves 245 and 244 are connected with the container 229 through a pipe 250 bifurcating to feed said valves. From the valve 244 there starts a pipe for distributing compressed air as shown at 251, said pipe leading to the cylinder slidably carrying the piston 246 whereas the valve 245 feeds a pipe 252 leading to the cylinder 247. Again there starts from the valve 244 a further pipe 253 leading to a safety valve 254 operated electrically and fed with compressed air through a further pipe 255 connected with the container 229. The electrically controlled valve 254 is also connected with a pipe 256 that feeds a clutch regulating cock 257 also fed with compressed air through a pipe 258 fed by the container 229.

Similarly, the valve 245 is provided with a pipe 259 feeding a safety valve 260 fed with compressed air through the agency of a pipe 261 connected with the container 229, said valve 260 being also connected through the pipe 262 with the above mentioned regulating cock 257. The regulating cock 257 is controlled by a pedal-operated gear 263 that at the end of its stroke actuates the pusher member of an electric switch 264. This electric switch may assume two stable positions corresponding respectively to cutting off and to engagement, these two positions being obtained through successive movements in the same direction of the pusher member operating said switch. Said switch is arranged in series with the feed circuit for the exhaust controlling valve 231 operated electrically.

The operation of the arrangement thus disclosed is as follows:

The apparatus being inoperative, while the engine rotates and the change speed gears are in their idle position, the supply of electricity being operative and the compressed air containers being under pressure, the engine driver depresses completely the pedal at 263 which results in a declutching and then in a closing of the circuit feeding the electrically controlled valve 231, which submits the distributor 213 to pressure. Said distributor is then in the position corresponding to first speed for both engines so that said speeds are then operative. The driver allows then the pedal 263 to rise slowly so that the compressed air contained in the cylinders 246 and 247 passes gradually through the regulating cock 257 towards the exhaust. The two engines are in clutch and the locomotive starts. When the driver without touching the pedal 263 causes the crank 218 to rotate, the boss 243 acts on the valve 244 so as to allow compressed air to enter the cylinder 246 and the engine 223 is disconnected without the same being the case for the engine 222. This disconnection lasts until the crank 218 has resumed its vertical position. During this time, the slide valve 204 in the distributor 213 has pivoted through 30° and the change speed gear 223 has been brought from the first speed to the second speed. The different operations continue with the two engines in a similar manner to allow the different combinations of speeds to follow one another automatically. It should be noticed that the stable position of the crank 218 has been chosen in a vertical plane for greater ease in operation. The same speeds are obtained in each change speed gear for instance for the lower position of the crank while different speeds are provided in its upper position. The dead center position may be obtained at any moment by submitting the electrically controlled valve 231 to exhaust conditions through the agency of the pusher member of the contact breaker 264 or through any other suitable means. It is in particular possible to provide various other means ensuring safety through a breaking of the circuit of said electrically controlled valve 231. It should be also considered that each clutch control cylinder is fed directly through the electrically controlled valve 254 or 260 when the corresponding change speed gear is not in its correct desired position, through the agency of the valve 244 or 245 when the cam 242 begins being operative or again, when neither said electrically controlled valves nor the valves 244—245 are controlled, through the agency of the cock 257 if the driver acts to a sufficient extent on the clutch disengagement pedal.

Obviously, without widening the scope of the present invention, as claimed in accompanying claims, it is possible to bring many modifications to the embodiments that have just been described.

What we claim is:

1. In a vehicle or the like mechanism, the combination of at least two power units, cooperating change speed gears, the reduction ratio between two speeds corresponding to two successive speed settings of the same speed box being smaller than the ratio between the allowable extreme speeds of the corresponding power unit when operating under maximum load, a clutch connecting each power unit with the corresponding change speed gear, separate actuating means for each change speed gear for simultaneously controlling the corresponding clutch and gear-shifting said change speed gear from one velocity stage to another, at least one transmission means connected with said change speed gears for transmitting power therefrom, and a free wheel inserted between each change speed gear and the corresponding transmission means for disconnecting the latter from said change speed gear when submitted to a velocity higher than that conventionally given by the actual velocity stage of said change speed gear.

2. In a vehicle or the like mechanism, the combination of at least two power units, cooperating change speed gears, a clutch connecting each power unit with corresponding change speed gear, separate actuating means for each change speed gear for simultaneously controlling the corresponding clutch and gear-shifting said change speed gear from one velocity stage to another, at least one transmission means connected with said change speed gears for transmitting power therefrom, a free wheel inserted between each change speed gear and the corresponding transmission means for disconnecting the latter from said change speed gear when submitted to a velocity higher than that conventionally given by the actual velocity stage of said change speed gear, and means controlling the speed and power of each power unit and controlled by the corresponding actuating means.

3. In a vehicle or the like mechanism, the combination of at least two power units, cooperating change speed gears, a clutch connecting each power unit with the corresponding change speed gear, separate fluid operated means adapted to disengage the different clutches, separate means controlling the gear shifting of each change speed gear from one velocity stage to another, means whereby the last mentioned means are locked by the fluid operated means when inoperative, at least one transmission means connected with said change speed gears for transmitting power therefrom, and a free wheel inserted between each change speed gear and the corresponding transmission means for disconnecting the latter from said change speed gear when submitted to a velocity higher than that conventionally given by the actual velocity stage of said change speed gear.

4. In a vehicle or the like mechanism, the combination of at least two fuel operated power units, cooperating change speed gears, a clutch connecting each power unit with the corresponding change speed gear, separate fluid operated means adapted to disengage the different clutches, separate means controlling the gear shifting of each change speed gear from one velocity stage to another, means whereby the last mentioned means are locked by the fluid operated means when inoperative, means controlling the fuel input into the different power units and adapted to reduce same under the action thereon of the fluid operated means, at least one transmission means connected with said change speed gears for transmitting power therefrom, and a free wheel inserted between each change speed gear and the corresponding transmission means for disconnecting the latter from said change speed gear when submitted to a velocity higher than that conventionally given by the actual velocity stage of said change speed gear.

5. In a vehicle or the like mechanism, the combination of at least two power units, cooperating change speed gears, a clutch connecting each power unit with the corresponding change speed gear, separate fluid operated means adapted to disengage the different clutches, a common supply of fluid for said hydraulic means, separate means controlling the gear-shifting of each change speed gear from one velocity stage to another, means whereby the last mentioned means are locked by the fluid operated means when inoperative, a valve adapted to prevent the feed of the fluid operated means through their common supply, an electric circuit controlling same and a series of means for energizing said circuit controlled by the position of the corresponding change speed gear out of correct speed engaging conditions, at least one transmission means connected with said change speed gears for transmitting power therefrom, and a free wheel inserted between each change speed gear and the corresponding transmission means for disconnecting the latter from said change speed gear when submitted to a velocity higher than that conventionally given by the actual velocity stage of said change speed gear.

6. In a vehicle or the like machine, the combination of at least two power units, change speed gears each of them being adapted to cooperate with one of said power units, separate means for operatively engaging each power unit with the corresponding change speed gear, transmission means respectively connected with said change speed gears for transmitting power therefrom, separate pneumatic means adapted to render the power unit engaging means inoperative, separate means for shifting the gears in each change speed gear from one velocity stage to another, means for locking last mentioned means through the pneumatic means when inoperative, a distributor adapted to control the separate pneumatic means and the separate gear-shifting means for obtaining in succession a disengagement of the first power unit, a gear-shifting for the associated change speed gear, a re-engagement of the first power unit, a disengagement of the second power unit, a gear-shifting for the associated change speed gear, a reengagement of the second power unit and further disengagement gear-shifting and reengagement operations in predetermined sequence, and a free wheel inserted between each change speed gear and the corresponding transmission means for disconnecting the latter from said change speed gear when submitted to a velocity higher than that conventionally given by the actual velocity stage of said change speed gear.

7. In a vehicle, the combination of two power units, change speed gears each of them being adapted to cooperate with one of said power units, separate means for operatively engaging each power unit with the corresponding change speed gear, transmission means respectively connected with said change speed gears for transmitting power therefrom, separate pneumatic means adapted to render the power unit engaging means inoperative, separate means for shifting the gears in each change speed gear from one velocity stage to another, means for locking last mentioned means through the pneumatic means when inoperative, reversing unit at the output of each change speed gear, vehicle axles controlled through said transmission means, and a free wheel inserted between each change speed gear and the corresponding transmission means for disconnecting the latter from said change speed gear when submitted to a velocity higher than that conventionally given by the actual velocity stage of said change speed gear.

8. In a vehicle or the like machine, the combination of at least two power units, change speed gears each of them being adapted to cooperate with one of said power units, separate means for operatively engaging each power unit with the corresponding change speed gear, transmission means respectively connected with said change speed gears for transmitting power therefrom, separate pneumatic means adapted to render the power unit engaging means inoperative, separate means for shifting the gears in each change speed gear from one velocity stage to another, an air compressor driven by at least one power unit, a compressed air container fed thereby, means for connecting same with the different pneumatic means and distributing means for controlling in the desired sequence the operation of the different pneumatic means and gear shifting means, and a free wheel inserted between each change speed gear and the corresponding transmission means for disconnecting the latter from said change speed gear when submitted to a velocity higher than that conventionally given by the actual velocity stage of said change speed gear.

9. In a vehicle or the like machine, the combination of at least two power units, change speed gears each of them being adapted to cooperate with one of said power units, separate means for operatively engaging each power unit with the corresponding change speed gear, transmission means respectively connected with said change speed gears for transmitting power therefrom, separate pneumatic means adapted to render the power unit engaging means inoperative, separate means for shifting the gears in each change speed gear from one velocity stage to another, a hand operable cam shaft, cams carried thereby, a plurality of auxiliary pneumatic means associated with each of the above mentioned main pneumatic means and adapted to control the gear-shifting in the corresponding change speed gears, valves controlling the operation of each main and auxiliary pneumatic means and adapted to be controlled in predetermined sequence by the cams with the alternation of pneumatic means of either series in operation, and a free wheel inserted between each change speed gear and the corresponding transmission means for disconnecting the latter from said change speed gear when submitted to a velocity higher than that conventionally given by the actual velocity stage of said change speed gear.

10. In a vehicle or the like machine, the combination of at least two power units, change speed gears each of them being adapted to cooperate with one of said power units, separate means for operatively engaging each power unit with the corresponding change speed gear, transmnssion means respectively connected with said change speed gears for transmitting power therefrom, separate pneumatic means adapted to render the power unit engaging means inoperative, separate means for shifting the gears in each change speed gear from one velocity stage to another, a plurality of auxiliary pneumatic means associated with each of the above mentioned main pneumatic means, means whereby said auxiliary pneumatic means control the operation of the gear-shifting means with a clearance, valves controlling the operation of the different main and auxiliary pneumatic means, means for controlling the operation of the different main pneumatic means and that of corresponding auxiliary pneumatic means while the main pneumatic means remains operative, and a free wheel inserted between each change speed gear and the corresponding transmission means for disconnecting the latter from said change speed gear when submitted to a velocity higher than that conventionally given by the actual velocity stage of said change speed gear.

11. In a vehicle or the like machine, the combination of at least two power units, change speed gears each of them being adapted to cooperate with one of said power units, separate means for operatively engaging each power unit with the corresponding change speed gear, transmission means respectively connected with said change speed gears for transmitting power therefrom, separate pneumatic means adapted to render the power unit engaging means inoperative, separate means for shifting the gears in said change speed gear from one velocity stage to another, means operable by the driver for controlling the pneumatic means corresponding to each unit and thereby the engagement of said unit, further means operable by the driver for mechanically operating the engaging means, means whereby the driver controls in the desired sequence the pneumatic disengaging means and the gear-shifting means, and a free wheel inserted between each change speed gear and the corresponding transmission means for disconnecting the latter from said change speed gear when submitted to a velocity higher than that conventionally given by the actual velocity stage of said change speed gear.

12. In a vehicle or the like machine, the combination of at least two power units, change speed gears each of them being adapted to cooperate with one of said power units, separate means for operatively engaging each power unit with the corresponding change speed gear, transmission means respectively connected with said change speed gears for transmitting power therefrom, separate pneumatic means adapted to render the power unit engaging means inoperative, separate means for shifting the gears in each change speed gear from one velocity stage to another, separate means each of them being mechanically controlled by the corresponding pneumatic means together with the corresponding engaging means for controlling the power and speed of the corresponding power unit, and a free wheel inserted between each change speed gear and the corresponding transmission means for disconnecting the latter from said change speed gear when submitted to a velocity higher than that conventionally given by the actual velocity stage of said change speed gear.

13. In a vehicle, the combination of at least two fluid operated engines, change speed gears each of them being adapted to cooperate with one of said engines, separate means for operatively engaging each engine with the corresponding change speed gear, transmission means respectively connected with said change speed gears for transmitting power therefrom, separate pneumatic means adapted to render the engine engaging means inoperative, separate means for shifting the gears in each change speed gear from one velocity stage to another, separate means each of them being mechanically controlled by the corresponding pneumatic means together with the corresponding engaging means for controlling the fluid feed to the corresponding engine to return said engine to idling conditions whatever the actual conditions governing said engine may be, and a free wheel inserted between each change speed gear and the corresponding transmission means for disconnecting the latter from said change speed gear when submitted to a velocity higher than that conventionally given by the actual velocity stage of said change speed gear.

14. In a vehicle or the like machine, the combination of at least two power units, change speed gears each of them being adapted to cooperate with one of said power units, separate means for operatively engaging each power unit with the corresponding change speed gear, transmission means respectively connected with said change speed gears for transmitting power therefrom, separate pneumatic means adapted to render the power unit engaging means inoperative, separate means for shifting the gears in each change speed gear from one velocity stage to another, an electrically controlled valve preventing operation of the system of pneumatic means, an electric circuit controlling said valve, means for energizing said circuit as long as the gears of any change speed gear are not exactly in a position corresponding to a definite speed, and a free wheel inserted between each change speed gear and the corresponding transmission means for disconnecting the latter from said change speed gear when submitted to a velocity higher than that conventionally given by the actual velocity stage of said change speed gear.

15. In a vehicle or the like machine, the combination of at least two power units, change speed gears each of them being adapted to cooperate with one of said power units, separate means for operatively engaging each power unit with the corresponding change speed gear, transmission means respectively connected with said change speed gears for transmitting power therefrom, separate pneumatic means adapted to render the power unit engaging means inoperative, separate means for shifting the gears in each change speed gear from one velocity stage to another, a free wheel inserted between each change speed gear and the corresponding transmission means for disconnecting the latter from said change speed gear when submitted to a velocity higher than that conventionally given by the actual velocity stage of said change speed gear, and a separate control station including, for each power unit, a plurality of hand operable levers controlling the gear-shifting in the corresponding change speed gear and adapted to assume a pivoting movement between their neutral and operative position and a translational movement in their neutral position to register with their different operative positions and means whereby their pivoting into neutral controls the corresponding pneumatic means operating the corresponding unit engaging means.

16. In a vehicle or the like machine, the combination of at least two power units, change speed gears each of them being adapted to cooperate with one of said power units, separate means for operatively engaging each power unit with the corresponding change speed gear, transmission means respectively connected with said change speed gears for transmitting power therefrom, separate pneumatic means adapted to render the power unit engaging means inoperative, separate means for shifting the gears in each change speed gear from one velocity stage to another, a free wheel inserted between each change speed gear and the corresponding transmission means for disconnecting the latter from said change speed gear when submitted to a velocity higher than that conventionally given by the actual velocity stage of said change speed gear, and a separate control station including, for each power unit, a plurality of levers controlling the gear-shifting in the corresponding change speed gear and adapted to assume a pivoting movement between their neutral and operative position and a translational movement in their neutral position to register with their different operative positions, a grid-shaped member showing longitudinal guiding means defining the translational movements of the levers and adapted to be shifted elastically transversally of said guiding means, through the pivoting of a lever into neutral and means whereby said shifting of the grid-shaped member controls the operation of the corresponding pneumatic means.

17. In a vehicle or the like machine, the combination of at least two power units, change speed gears each of them being adapted to cooperate with one of said power units, separate means for operatively engaging each power unit with the corresponding change speed gear, transmission means respectively connected with said change speed gears for transmitting power therefrom, separate pneumatic means adapted to render the power unit engaging means inoperative, separate means for shifting the gears in each change speed gear from one velocity stage to another, a plurality of auxiliary pneumatic means associated with each of the above mentioned main pneumatic means, a source of compressed air, a distributor including a rotary ported slide valve and cooperating stationary ported slide face adapted to control the feed of compressed air to the different pneumatic means in predetermined sequence as it is caused to rotate, and a free wheel inserted between each change speed gear and the corresponding transmission means for disconnecting the latter from said change speed gear when submitted to a velocity higher than that conventionally given by the actual velocity stage of said change speed gear.

18. In a vehicle or the like machine, the combination of at least two power units, change speed gears each of them being adapted to cooperate with one of said power units, separate means for operatively engaging each power unit with the corresponding change speed gear, transmission means respectively connected with said change speed gears for transmitting power therefrom, separate pneumatic means adapted to render the power unit engaging means inoperative, separate means for shifting the gears in each change speed gear from one velocity stage to another, a plurality of auxiliary pneumatic means associated with each of the above mentioned pneumatic means, a source of compressed air, a distributor including a rotary ported slide valve and cooperating stationary ported slide face adapted to control the feed of compressed air to the different auxiliary pneumatic means, a rotary hand operated member for controlling the rotation of the slide valve through predetermined steps for obtaining the desired sequence of gearshiftings, a cam controlled by said hand operated member, means whereby said cam controls the operation of each of said main pneumatic means between two predetermined successive steps of the hand operated member, and a free wheel inserted between each change speed gear and the corresponding transmission means for disconnecting the latter from said change speed gear when submitted to a velocity higher than that conventionally given by the actual velocity stage of said change speed gear.

19. In a vehicle or the like machine, the combination of two power units, change speed gears each of them being adapted to cooperate with one of said power units, separate means for operatively engaging each power unit with the corresponding change speed gear, transmission means respectively connected with said change speed gears for transmitting power therefrom, separate pneumatic means adapted to render the power unit engaging means inoperative, separate means for shifting the gears in each change speed gear from one velocity stage to another, a plurality of auxiliary pneumatic means associated with each of the above mentioned pneumatic means, a source of compressed air, a distributor including a rotary ported slide valve and cooperating stationary ported slide face adapted to control the feed of compressed air to the different auxiliary pneumatic means, a rotary hand operated member, a reducing gear actuated thereby for controlling the rotation of the slide valve through predetermined steps for obtaining the desired sequence of gear-shiftings, each step corresponding to an angular movement of the hand operated member equal to a revolution divided by the number of power units, a cam controlled by said hand operated member, valves each of them being inserted in the main pneumatic means corresponding to one of said power units and adapted to be operated for disengagement of said corresponding power unit each time the cam passes through the corresponding angular step and for a reengagement of said power unit each time said cam passes through the following angular step while simultaneously the corresponding valve is operated for disengagement of the following power unit, and a free wheel inserted between each change speed gear and the corresponding transmission means for disconnecting the latter from said change speed gear when submitted to a velocity higher than that conventionally given by the actual velocity stage of said change speed gear.

20. In a vehicle or the like machine, the combination of at least two power units, change speed gears each of them being adapted to cooperate with one of said power units, separate means for operatively engaging each power unit with the corresponding change speed gear, transmission means respectively connected with said change speed gears for transmitting power therefrom, separate pneumatic means adapted to render the power unit engaging means inoperative, separate means for shifting the gears in each change speed gear from one velocity stage to another, a plurality of auxiliary pneumatic means associated with each of the above mentioned pneumatic means, a source of compressed air, a distributor including a rotary ported slide valve and cooperating stationary ported slide face adapted to control the feed of compressed air to the different auxiliary pneumatic means, a rotary hand operated member for controlling the rotation of the slide valve through predetermined steps for obtaining the desired sequence of gear-shiftings, a cam controlled by said hand operated member and means whereby said cam controls the operation of each of the main pneumatic means between two corresponding successive steps of the hand operated member, valves each of them for controlling one main pneumatic means, an electric system controlling said valves, means for energizing said system whenever any of the change speed gears is out of an accurate speed providing position, and a free wheel inserted between each change speed gear and the corresponding transmission means for disconnecting the latter from said change speed gear when submitted to a velocity higher than that conventionally given by the actual velocity stage of said change speed gear.

21. In a vehicle or the like machine, the combination of at least two power units, change speed gears each of them being adapted to cooperate with one of said power units, separate means for operatively engaging each power unit with the corresponding change speed gear, transmission means respectively connected with said change speed gears for transmitting power therefrom, separate pneumatic means adapted to render the power unit engaging means inoperative, separate means for shifting the gears in each change speed gear from one velocity stage to another, a plurality of auxiliary pneumatic means associated with each of the above mentioned main pneumatic means, a source of compressed air, a distributor including a rotary ported slide valve and cooperating stationary ported slide face adapted to control the feed of compressed air to the different pneumatic means in predetermined sequence as it is caused to rotate, a valve adapted to connect the slide valve and slide face ports with the atmosphere, electric means controlling said valve, an engagement adjusting valve in both main pneumatic means, a pedal controlling simultaneously last mentioned valve and the electric means, and a free wheel inserted between each change speed gear and the corresponding transmission means for disconnecting the latter from said change speed gear when submitted to a velocity higher than that conventionally given by the actual velocity stage of said change speed gear.

MICHEL ALBERT JULES HONNORÉ.
PIERRE MARIE FELIX ZENS.

REFERENCES CITED

The following references are of record in the file of this patent:

UNITED STATES PATENTS

| Number | Name | Date |
|---|---|---|
| 2,125,163 | Hacker et al. | July 26, 1938 |

FOREIGN PATENTS

| Number | Country | Date |
|---|---|---|
| 281,640 | Great Britain | 1929 |